Figure 1:
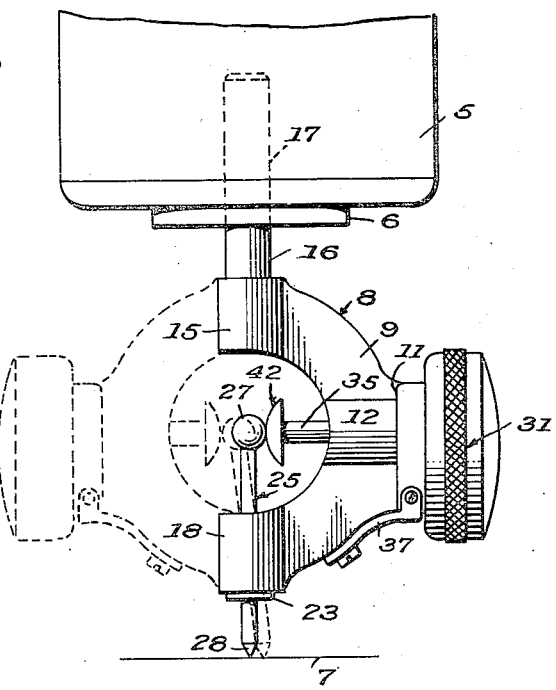

March 23, 1937. D. A. ROBERTS 2,074,990
LOCATION TOOL
Filed June 6, 1936

Inventor
DAVID A. ROBERTS
Kimmel & Crowell
Attorneys

Patented Mar. 23, 1937

2,074,990

UNITED STATES PATENT OFFICE 2,074,990

LOCATION TOOL

David A. Roberts, Flint, Mich.

Application June 6, 1936, Serial No. 83,990

6 Claims. (Cl. 33—172)

This invention relates to a location tool designed primarily for use with vertical and horizontal milling machines, lathes or drill presses, but it is to be understood that a tool, in accordance with this invention is to be employed in any connection for which it may be found applicable, and the invention has for its objects to provide, in a manner as hereinafter set forth, a tool of the class referred to, for accurately locating the center punched point of a hole to be drilled in a piece of work, in the center plane of the machine spindle.

A further object of the invention is to provide, in a manner as hereinafter set forth, a tool of the class referred to including means carried with and turning with the spindle of the machine, when such spindle is turned, whereby the error of the point from the center line is visibly indicated on an indicating means, and then by giving a transverse or horizontal movement to the work, arranged on a support and a further turn of the spindle, the indicator will set forth when the point has been brought to perfect centralization with respect to the center line of the spindle at which time the location operation is discontinued.

After a piece of work has been laid out as to positions where openings are to be bored or drilled, the positions being defined by oppositely extending intersecting lines, then a small punch point is provided in the work at such intersections of the lines to indicate the center of the opening which is to be formed in the work. In some instances some of the punched points do not align with the center or axis of the machine spindle. The tool, in accordance with this invention is to accurately locate the said non-aligned punch points after which the work is shifted to provide such points to align with the center of the machine spindle.

Further objects of the invention are to provide, in a manner as hereinafter set forth, a location tool which is simple in its construction and arrangement, strong, durable, compact, thoroughly efficient in its use, readily installed with respect to a spindle of a drilling or boring machine for location of the punched points on the work relative to the axis of the spindle; expeditious in its action; will overcome the necessity of placing buttons on a job; will speed up the work by locating numerous points on one job; will definitely inform the attendant when a point is accurately located instead of depending on the means now generally employed for such purpose; and inexpensive to manufacture.

With the foregoing and other objects in view, the invention consists of the novel construction, combination and arrangement of parts as will be more specifically described and as illustrated in the accompanying drawing wherein is shown an embodiment of the invention, but it is to be understood that changes, variations and modifications may be resorted to which fall within the scope of the invention as claimed.

Figure 2:
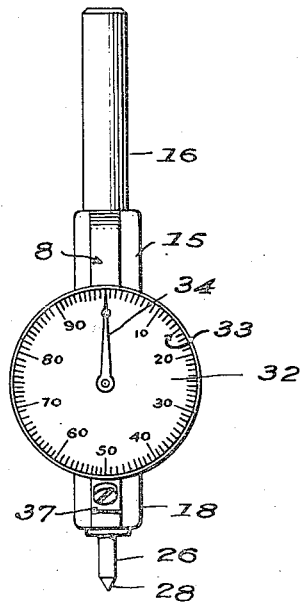
Figure 3:
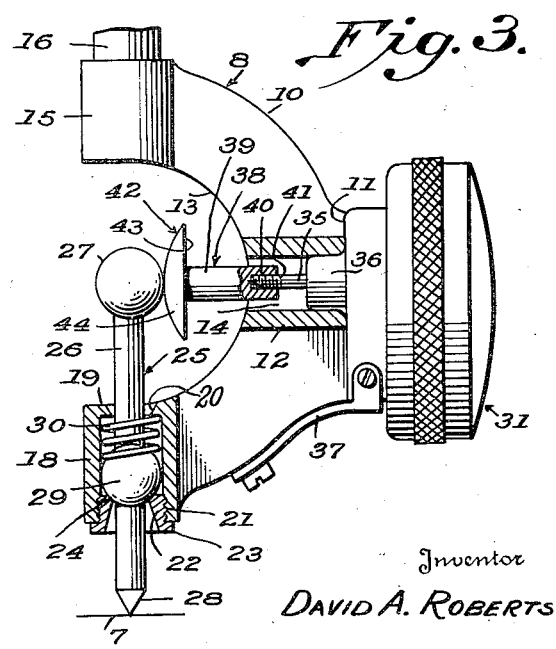

In the drawing:

Figure 1 is a front elevation of the tool as applied to a vertically disposed rotatable spindle of a milling machine and further indicating in full and dotted lines the bodily movement of the tool with the spindle, Figure 2 is a top plan view of the tool, and Figure 3 is a side elevation, broken away, and partly in horizontal section of the tool.

With reference to Figure 1 a rotatable spindle of a milling machine is indicated at 5 and 6 designates a collet. The spindle 5 is shown by way of example as being vertically disposed. The work is indicated at 7 Figures 1 and 3.

The tool generally designated 8 includes an arch-shaped body part 9 formed centrally of its outer edge 10 with a flat edge portion 11. The body part 9 at its center is enlarged, as at 12. The enlargement 12 is disposed transversely of body part 9 and extends from its inner edge 13 to the flat outer edge portion 11. The enlargement 12 is formed with an opening 14 from end to end thereof. One end of the body part 9 has formed integral therewith a sleeve or enlargement 15 which is disposed in a plane parallel to the plane of the edge portion 11. Integral with the sleeve 15 is a center line forming bar 16 which is of the desired length, extends from the outer end of sleeve 15 and has a portion of its length disposed axially within the boring or drilling tool receiving socket 17 in the spindle 5. The bar 16 is secured with the spindle 5 by the collet 6 and is disposed at right angles to body part 9. The other end of the body part 9 has formed integral therewith a sleeve 18 provided at its inner end with an inwardly extending annular flange 19 formed with a flared or beveled edge 20. The sleeves 18, 15 are disposed in inner endwise spaced alignment. The sleeve 18 is arranged in the same plane as sleeve 15. The inner face of sleeve 18 at its outer end is formed with threads 21.

Extending into the outer end of sleeve 18 and engaging with the threads 21 is a tubular peripherally threaded flanged combined retainer and seat forming member 22. The flange on member 22 is at its outer end, indicated at 23 and abuts the outer end edge of sleeve 18. The inner part of the inner end edge of member 22 is dished out to form a curved annular seat or fulcrum point 24 for a part of a finder element to be referred to. The inner face of member 22, from the seat 24 to the outer end edge of said member gradually increases in diameter.

The tool 8 includes an angularly shiftable or tiltable spring controlled finder element 25 which extends through and projects outwardly from sleeve 18. The element 25 consists of a bar 26 having its inner end in the form of a globular enlargement 27 and its outer end pointed, as at 28 for seating in the punched point in the work. The bar 26 between its transverse median and its pointed end 28 is formed with a globular enlargement 29 which is mounted against and fulcrums on seat 24. The normal position of element 25 is when its axis aligns with the axis of the bar 16. Surrounding the bar 26 and interposed between the flange 19 and the enlargement 29 is a coiled controlling spring 30 acting to maintain the enlargement 29 against seat 24.

The tool 8 includes an indicator mechanism 31 of known construction and of that type including a stationary dial 32 provided with designated graduations 33, a shiftable pointer 34 and a spring controlled push rod 35 for operating its spring controlled actuating means for the pointer to move the latter in clockwise and anti-clockwise directions relative to the face of the dial. The mechanism 31 includes a part 36 which extends into the outer end of opening 14 and from which rearwardly extends the push rod 35. The mechanism 31 seats against the edge portion 11 and is connected to the body part 9 by an attaching means 37.

The tool 8 includes an operating element 38 for the push rod 35. The element 31 extends at one end into the opening 14 and consists of a short bar 39 having that end thereof positioned in the opening 14 formed with a threaded socket 40 for connecting to element 38 the push rod 35. The latter has a peripherally threaded terminal portion 41 for engagement with the threads of the socket. The other end of bar 39 is formed with a head 42 of segmental contour having the bar 39 merging into its flat face 43 axially of the latter. The curved face 44 of head 42 is arranged in the path of the enlargement 27 which acts, when element 25 is inclined to the left (see dotted line position Figure 1 in the revolving of the spindle carrying the tool therewith) with respect to sleeve 18, forces the element 38 towards the mechanism 31 carrying the rod 35 therewith thereby providing for the moving of the pointer 34 relative to the dial to indicate that the punched point in the work is not aligned with the center line of the spindle.

When the punched point does not align with the center line of the spindle, the work is adjusted to bring the punched point to such alignment and a reading of mechanism 31 will determine when the alignment is had. The normal position of the elements 35, 38 is as shown in Figure 1 in full lines. If the punched point is in proper alignment the elements 35, 38 will be in the position shown in Figure 3.

What I claim is:

1. A location tool comprising a body part, including end terminal portions, each formed with a pair of side edges, the inner side edge of one end terminal portion being disposed in parallel spaced relation to the inner side edge of the other end terminal portion, a center line bar fixed to and extending outwardly at right angles to the outer side of one of said end terminal portions, adapted to be connected to and axially of a rotatable spindle to provide for the tool bodily rotating with the spindle, a spring controlled angularly shiftable finder element seated intermediate its ends in, extending inwardly and outwardly from and coupled with the other end terminal portion, said finder element having a pointed outer end for seating in a punched point of the work, an indicator mechanism carried by said body part and spaced from said terminal portions, and an operating element for and secured at one end with said mechanism, said operating element extending inwardly from said mechanism to between said end terminal portions and having its other end arranged in the path of the inner end of the finder element to be actuated from the latter on the angular shifting of said finder element.

2. A location tool comprising a body part, including end terminal portions, each formed with a pair of side edges, the inner side edge of one end terminal portion being disposed in parallel spaced relation to the inner side edge of the other end terminal portion, a center line bar fixed to and extending outwardly at right angles to the outer side of one of said end terminal portions, adapted to be connected to and axially of a rotatable spindle to provide for the tool bodily rotating with the spindle, a spring controlled angularly shiftable finder element seated intermediate its ends in, extending inwardly and outwardly from and coupled with the other end terminal portion, said finder element having a pointed outer end for seating in a punched point of the work, an indicator mechanism carried by said body part and spaced from said terminal portions, and an operating element for and secured at one end with said mechanism, said operating element extending inwardly from said mechanism to between said end terminal portions and having its other end arranged in the path of the inner end of the finder element to be actuated from the latter on the angular shifting of said finder element, said body part being of arcuate contour, and said operating element extending into said body part.

3. A location tool comprising a body part, a center line bar fixed to and extending at right angles to one end of said body part and adapted to be connected to and axially of a rotatable spindle to provide for the tool bodily rotating with the spindle, a spring controlled angularly shiftable finder element extending through, coupled with and seated in the other end of said body part, said finder element having a pointed outer end for seating in a punched point of the work, an indicator mechanism carried by said body part intermediate the ends of the latter, an operating element for and secured at one end with said mechanism, said operating element having its other end arranged in the path of the inner end of the finder element to be actuated from the latter on the angular shifting of said finder element, the inner end of the finder element being of globular contour, and that end of the operating element arranged in the path of the inner end of the finder element being of segmental contour.

4. A location tool comprising a body part, including end terminal portions, each formed with a pair of side edges, the inner side edge of one end terminal portion being disposed in parallel spaced relation to the inner side edge of the other end terminal portion, a center line bar fixed to and extending at right angles to one end terminal portion of said body part and adapted to be connected to and axially of a rotatable spindle to provide for the tool bodily rotating with the spindle, a spring controlled angularly shiftable finder element extending through and loosely coupled with the other end terminal portion of said body part, said finder element having a pointed outer end for seating in a punched point of the work, an indicator mechanism carried by and spaced from the end terminal portions of said body part, an operating element for and secured at one end with said mechanism, said operating element extending inwardly from said mechanism between said end terminal portions and having its other end arranged in the path of the inner end of the finder element to be actuated from the latter on the angular shifting of said finder element, the said end terminal portion of said body part through which said finder element extends having a dished out portion constituting a seat for the finder element, and that portion of the latter engaging said seat being of globular contour.

5. A location tool comprising an arch-shaped body part provided centrally thereof with a transverse opening, an indicator mechanism secured against the outer edge of said body part centrally of the latter and extending into said opening, a center line bar fixed to and extending outwardly at right angles to one end of said body part, the other end of said body part being of tubular form and provided with an inwardly extending annular flange at its inner end, an angularly shiftable finder element having a globular inner end, a globular enlargement intermediate its ends and a pointed outer end, tubular means secured to and extending into the said other end of said body portion to provide a seat, said element extending through the said other end of said body portion and having its enlargement bearing against said seat, a controlling spring surrounding said element and interposed between said flange and enlargement, and an operating element extending into said opening for and connected to said mechanism, said operating element being operated from the inner end of the finder element on the angular shifting of the latter.

6. In a center line location tool, a structure for connection to a rotatable spindle to bodily rotate therewith, said structure including a spring controlled tiltable finder element for seating at its outer end in a punch point of the work, an indicator mechanism disposed at right angles to said element, an operating element for said mechanism extended from the latter and disposed at right angles to said finder element, said operating element having one of its ends riding against the inner end of the finder element and actuated from said finder element on the tilting of the latter to operate said mechanism, the inner end of said finder element being of globular contour, and the said end of the operating element being of segmental contour.

DAVID A. ROBERTS.